(12) United States Patent
Jelavic et al.

(10) Patent No.: US 9,928,671 B2
(45) Date of Patent: Mar. 27, 2018

(54) SYSTEM AND METHOD OF ENHANCED IDENTITY RECOGNITION INCORPORATING RANDOM ACTIONS

(71) Applicant: Honeywell International Inc., Morristown, NJ (US)

(72) Inventors: Robert Jelavic, East Northport, NY (US); Eric Oh, Syosset, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 294 days.

(21) Appl. No.: 14/497,769

(22) Filed: Sep. 26, 2014

(65) Prior Publication Data
US 2016/0093129 A1   Mar. 31, 2016

(51) Int. Cl.
G06F 21/32 (2013.01)
G10L 15/00 (2013.01)
G07C 9/00 (2006.01)

(52) U.S. Cl.
CPC ......... *G07C 9/00087* (2013.01); *G06F 21/32* (2013.01); *G06F 2221/2103* (2013.01)

(58) Field of Classification Search
CPC ................................................ G07C 9/00087
See application file for complete search history.

(56) References Cited

U.S. PATENT DOCUMENTS

| 6,195,698 | B1   | 2/2001  | Lillibridge et al. |
| 6,421,453 | B1 * | 7/2002  | Kanevsky ............. G06F 21/316 340/5.2 |
| 7,929,805 | B2   | 4/2011  | Wang et al. |
| 8,970,348 | B1 * | 3/2015  | Evans ....................... G06K 9/00 340/5.52 |
| 9,119,068 | B1 * | 8/2015  | Hubble ................. H04W 12/06 |
| 2005/0110634 | A1 * | 5/2005 | Salcedo ........... G08B 13/19673 340/539.1 |
| 2005/0275505 | A1 | 12/2005 | Himmelstein |
| 2012/0130714 | A1 * | 5/2012 | Zeljkovic ................ G10L 17/24 704/235 |
| 2012/0242603 | A1 * | 9/2012 | Engelhardt ......... G06F 3/03545 345/173 |
| 2013/0227651 | A1 | 8/2013 | Schultz et al. |
| 2014/0004826 | A1 | 1/2014 | Addy et al. |
| 2014/0101740 | A1 * | 4/2014 | Li ........................... G06F 21/32 726/7 |
| 2014/0109200 | A1 * | 4/2014 | Tootill .................... G06F 21/32 726/5 |
| 2016/0098622 | A1 * | 4/2016 | Ramachandrula . G06K 9/00892 382/116 |

OTHER PUBLICATIONS

Extended European search report for corresponding EP patent application 15186516.9, dated Dec. 9, 2015.

* cited by examiner

*Primary Examiner* — Joseph Feild
*Assistant Examiner* — John Mortell
(74) *Attorney, Agent, or Firm* — Husch Blackwell LLP

(57) ABSTRACT

A system and a method are provided for authenticating a requester seeking service. In response to a received request, the system selects a random biometric behavior. A request to provide the selected behavior is output by the system. Evaluation circuitry compares a received behavioral response from a requester to information from an authorized user database and determines if the requested service should be provided.

13 Claims, 1 Drawing Sheet

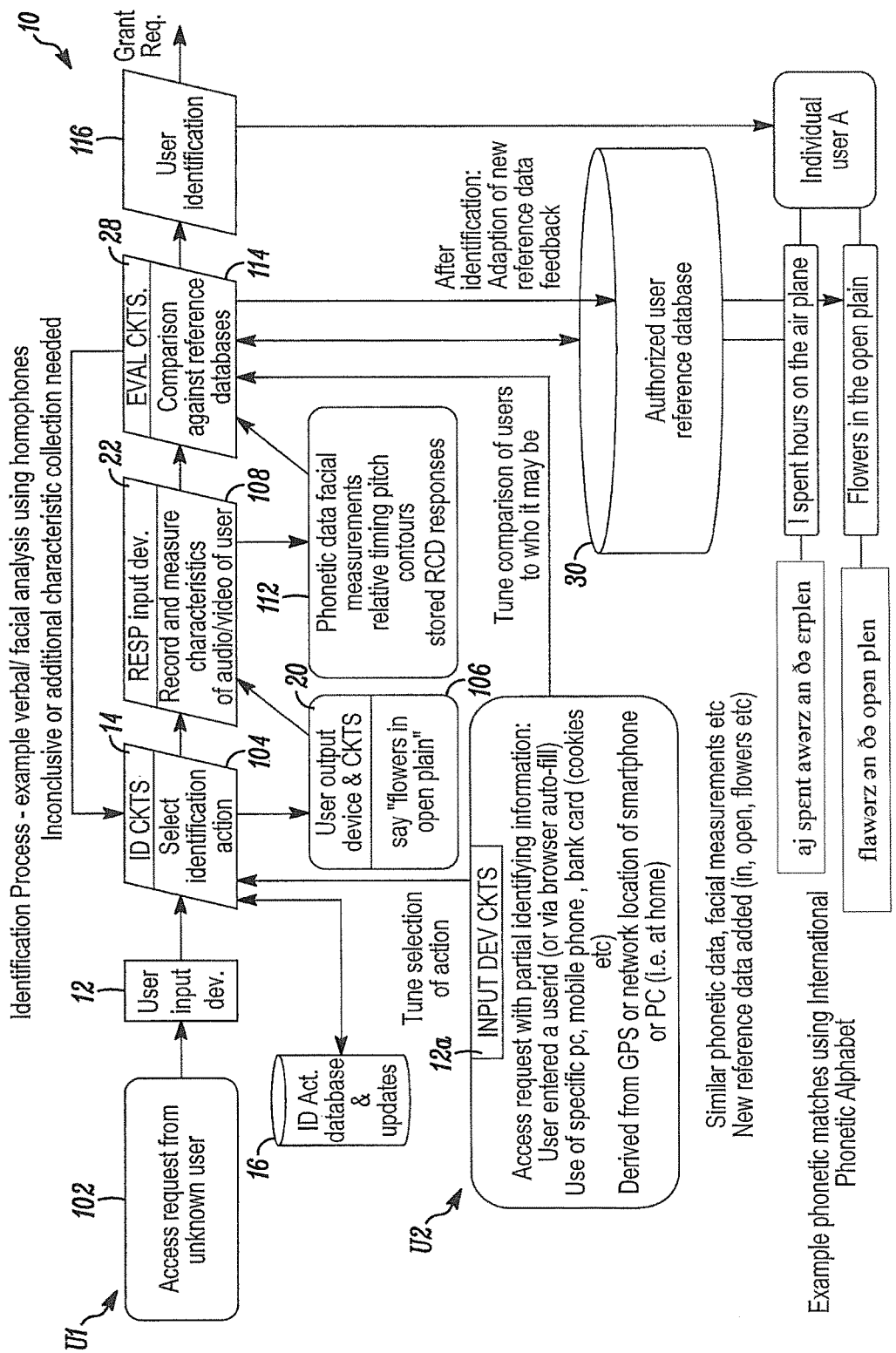

SYSTEM AND METHOD OF ENHANCED IDENTITY RECOGNITION INCORPORATING RANDOM ACTIONS

FIELD

The application pertains to authentication systems and methods usable by individuals. More particularly, the application pertains to regional monitoring, security, or access systems that combine anatomical characteristics with responses to requested random behaviors.

BACKGROUND

There are many commercial applications that need to authenticate users, for example, door access systems found in hotels, businesses, or the like. Monitoring systems or system control panels need to verify that an expected user is, in fact, the one interfacing with the system or a control panel keypad.

Known facial and voice recognition systems are less than 100% accurate. Pre-recorded video/imagery/audio of an authorized user can be used to defeat these systems in security applications. Additionally, passwords for security systems or control panels can also be easily compromised if a different user learns a code.

There is, thus, a continuing need to improve anatomically based authentication systems.

BRIEF DESCRIPTION OF THE DRAWINGS

FIG. 1 illustrates a combined block and flow diagram of an embodiment hereof.

DETAILED DESCRIPTION

While embodiments can take many different forms, specific embodiments thereof are shown in the drawings and will be described herein in detail with the understanding that the present disclosure is to be considered as an exemplification of the principles hereof as well as the best mode of practicing the same. No limitation to the specific embodiment illustrated is intended.

In one aspect, facial and/or voice recognition systems or circuitry can be combined with random actions requested by an authentication system to confirm both that detected imagery/audio is from an authorized user and that the user is present in person. In a disclosed, exemplary system, the user or individual seeking service or access would be prompted to perform one or more random actions that cannot be anticipated.

The system would require the user or requester to perform the action(s) within a set period of time. Some examples of these actions include one or more of
  touching his nose with his right thumb,
  touching his left ear,
  smiling,
  making a sad face,
  reading a random passage, and
  turning his head left.

User facial/voice training during setup and continuous adaption thereafter can be implemented by embodiments hereof to improve the performance of authenticating the requester or user. For example, voice training would require an authorized requester or user to read a script that characterizes his voice. Specifically, to increase security, a training script need not include all of the words in random passages. In this circumstance, the system would both authenticate the requester based on correct sounds and apply new words being introduced once the user was authenticated.

In another embodiment the system could authenticate the user by whatever criterion was acceptable at the time. Then, it would ask the user to smile or exhibit another gesture or facial image and learn new facial biometrics for the action to be used at some later time. At some point later, the system could be updated or may rely on cloud based services to change the collection of actions used to randomize the authentication process.

In the case of failed attempts, an owner on file can be notified along with a video clip of a failed attempt. As a backup for critical applications such as for a security panel, failed attempts can be immediately viewed and evaluated by a human operator at a central control station. As a deterrent to attempts at defeating the system, recorded video can also be used for criminal prosecution.

In addition to security panels, this approach can be used to increase the security for any user identity application, including, but not limited to smartphone access, computers/laptops, security door access, timecards, or banking ATMs. Websites could rely on the approach instead of passwords to log in to sites. By requiring the user to perform a random action, there is a higher certainty in both that the user is present and of his identity.

In yet another aspect, the system can instruct the user to perform random actions while applying a combination of voice and facial recognition algorithms relative to captured audio and video. Both embedded and Internet based (cloud based) systems are available.

For voice recognition, random phrases could be partially trained. That is, some words or sounds can be part of initial training, and the phrases can be broken down into structural units of speech (i.e. phonemes) so that the user's voice is evaluated against a training sample rather than a whole phrase. The phonemes that were not part of the original training could be used to refine the original training once all of the other authentication checks passed. The associations betweeen the phonemes and collected identity data are managed in an authorized user reference database. For voice recognition, a random phrase generator can create a new challenge phrase based on identified phonemes and phonetic dictionaries. One such alphabet for phonemes is the International Phonetic Alphabet. This system could be used for any spoken language.

For facial recognition, separate frames of video can be analyzed. In selected embodiments, changes in key dimensions, such as size/shape/distances/color of the eyes, eyebrows, chin, face outline, teeth or mouth relative to the nose or other facial structures, can be evaluated. The identity of the requester or user can be evaluated through the reading of text in conjunction with voice and through motion, such as the way the hand may touch the face (or the shape of the hand itself).

It will be understood that neither the type nor the form of use of a randomizing request are limitations hereof. All such randomizing events come within the spirit and scope hereof.

FIG. 1 illustrates an integrated system 10 and flow diagram 100 illustrating an embodiment hereof. The system 10 includes one or more user or requester input devices 12, 12a that can be the same or different. Representative input devices include key pads, touch screens, card readers, wireless receivers, and the like without limitation.

An unknown user or requester U1 can make an access request via the input device 12, as at 102, while providing minimal identification information. Alternately, an access can be provided by a user U2 in combination with partial identifying information, via the input device and circuits 12a.

The user inputs can be coupled to identification circuits 14 that can select a random identification action, as at 104. An updatable identification data base 16 can be interrogated by the circuits 14, which can select the random identification action.

The selected identification action can be presented, as at 106, in a verbal or visual format, via a user output device and related circuits 20. Representative random action requests can include a text request displayed on a screen of the device 20, for example, read this . . . , or do this . . . Alternately, audio instructions can be output via the device 20, such as repeat the following. In yet another alternate, a visual behavior, such as touch your nose or touch your ear, can be requested.

The provided responses are received at a response input device 22. The device 22 can include one or more microphones or cameras. As illustrated, as at 108, received audio or video characteristics of the user or requester, such as U1 or U2, can be recorded, analyzed, and measured, as at 108.

The received responses, as may be processed, including phonetic data, facial measurements, relative timing, or pitch contours all without limitation, can be stored in one or more storage devices, as at 112. Evaluation circuits 28 coupled to the response input device 22 and an authorized user reference database 30 can compare the received responses to expected responses, as at 114. In this regard, where partial identifying information has been provided, via the device and circuits 12a, that information can be incorporated into the evaluation by the circuits 28.

Depending on the results of the comparison, as at 114, a determination can be made, as at 116, as to the identity of the user and whether the user's request will be granted.

Those of skill will understand that a variety of homophones and common phonetic sounds can be incorporated into information stored in the identification action data base 16. Some examples of these and their International Phonetic Alphabet translations include:

--- bottle / model (match "ə" from "batəl / madəl")
flower / plow (match "aw" from "flawər / plaw")
Here / hear / ear (match "ɪr" from "hɪr / hɪr /ɪr")
Plate / eight / ate (match "et" from "plet / et / et")
Greenery / scenery (match "inəri" from "grinəri / sinəri")
Explain / plane / airplane / plain (match "plen" from ɪksplen / plen / ɛrplen / plen)
To / two / too (tu / tu / tu)
Beat / beet (bit / bit)
Air / heir (ɛr / ɛr)
Hare / hair (hɛr / hɛr)
Bare / Bear (bɛr / bɛr)
Know / no (no / no)
Wait / weight (wet / wet)
Flowers in the open plain (match awərz/ðə /plen from "flawərzən ðən plen")
I spent hours on the airplane (match awərz/ðə /plen from "aj spɛnt awərz an ðə ɛrplen")

---

The random action selection process, as at 104, can request a user or requester to perform a second identification action to collect new identity references for future access once the user has been authenticated. Alternately, the user can be asked to perform a combined action that authenticates while collecting additional identity information, such as reusing words, phrases, or phonemes or using homophones. Advantageously, in both modes, the system performs continuous adaption to tune authentication based on known reference information to determine acceptable variability of received responses.

In summary, the combination of these approaches with a randomized action determined by the secure system can increase the certainty of the identity of the user. In a further aspect, the above described method can also be used by a website to test for human interaction without identification. By requesting a user or requester to perform random actions as described herein, it becomes more difficult for an intruding computer system to generate correct audio and video responses in an allotted time interval. The likelihood of successful intrusion is thereby reduced.

A simplified version of this computing system could also be used as a "reverse Turing test" administered to simply determine whether the unknown user is a human by challenging him to perform these random actions. For example, a website could test the unknown user to perform the action and test for basic facial/vocal matches to prevent bots from posting spam or skewing online polls. This would be applicable for low security needs as well as where bandwidth, processing, and/or database constraints are limited.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

Further, logic flows depicted in the FIGURE do not require the particular order shown or sequential order to achieve desirable results. Other steps may be provided, steps may be eliminated from the described flows, and other components may be added to or removed from the described embodiments.

The invention claimed is:

1. A method comprising:
   a processor receiving initial biometric data related to an authorized user during a training phase, wherein the initial biometric data comprises audio data of a voice of the authorized user when reading a training script comprising a plurality of phonemes;
   the processor storing the initial biometric data in an authorized user database;
   the processor receiving a first request for service including an identifier from a requesting user;
   the processor evaluating the identifier and requesting a first random physiological response from the requesting user, wherein the first random physiological response comprises the requesting user speaking a random word or phrase that includes both at least one phoneme selected from the plurality of phonemes and at least one new phoneme not included within the plurality of phonemes, and wherein the first random physiological response further comprises the requesting user performing one action selected from a group consisting of the requesting user touching his or her nose, the requesting user touching his or her ear, the requesting user smiling, the requesting user making a sad face, and the requesting user turning his or her head;
   the processor receiving the first random physiological response from the requesting user;
   the processor evaluating the first random physiological response and determining whether the first random physiological response corresponds to a predetermined response;

the processor determining that the requesting user is the authorized user when the first random physiological response corresponds to the predetermined response;

the processor requesting a second random physiological response from the requesting user after authenticating the requesting user, wherein the processor receives and stores the second random physiological response in the authorized user database, wherein the second random physiological response is not used for authenticating the requesting user responsive to the first request for service, and wherein the second random physiological response is used for authenticating the requesting user responsive to a subsequent request for service.

2. A system comprising:

a user input device that receives a first service request;

training circuits coupled to the user input device and configured to (1) receive initial biometric data related to an authorized user during a training phase and (2) store the initial biometric data in an authorized user database, wherein the initial biometric data comprises audio data of a voice of the authorized user when reading a training script comprising a plurality of phonemes;

identification circuits coupled to the user input device and configured to select and generate a first authentication request for a first random authentication behavior, wherein the first random authentication behavior comprises a requesting user speaking a random word or phrase that includes both at least one phoneme selected from the plurality of phonemes and at least one new phoneme not included within the plurality of phonemes, and wherein the first random authentication behavior further comprises the requesting user performing one action selected from a group consisting of the requesting user touching his or her nose, the requesting user touching his or her ear, the requesting user smiling, the requesting user making a sad face, and the requesting user turning his or her head;

output circuits that present the first random authentication behavior audibly or visually; and evaluation circuits that receive a user response to the first authentication request and determine whether the user response corresponds to an expected response, wherein, after the evaluation circuits authenticate the requesting user, the identification circuits generate a second authentication request requesting a second random authentication behavior from the requesting user, wherein the evaluation circuits receive and store the second random authentication behavior in the authorized user database, wherein the second random authentication behavior is not used for authenticating the requesting user responsive to the first service request, and wherein the second random authentication behavior is used for authenticating the requesting user responsive to a subsequent service request.

3. The system as in claim 2 wherein a regional monitoring system includes the identification circuits and the evaluation circuits.

4. The system as in claim 3 wherein the output circuits present the first authentication request both audibly and visually.

5. The system as in claim 2 wherein the user input device includes at least one of a video camera directed to a viewing region and a microphone.

6. The system as in claim 5 wherein the at least one of the video camera or the microphone is coupled to the identification circuits.

7. The system as in claim 2 wherein the evaluation circuits store the expected response.

8. The system as in claim 7 further comprising correspondence processing that includes frequency domain processing, mathematical processing, or phoneme-type processing.

9. The system as in claim 8 wherein, in response to a failure of correspondence between the user response and the expected response, video of a failed attempt is forwarded to a displaced monitoring station.

10. The system as in claim 9 wherein the user input device includes a communications unit coupled to the identification circuits, and wherein the communications unit includes a microphone, a video camera, and an audio or visual output device to present the first authentication request.

11. The system as in claim 10 wherein the user response is selected from a class that includes phonetic data, facial measurements, relative timing, and pitch contours.

12. The system as in claim 2 further comprising an identification action database.

13. A system comprising:

a user input device that receives a first access request;

training circuits coupled to the user input device and configured to (1) receive initial biometric data related to an authorized user during a training phase and (2) store the initial biometric data in an authorized user database, wherein the initial biometric data comprises audio data of a voice of the authorized user when reading a training script comprising a plurality of phonemes;

selection circuits to select and generate a first authentication request for a first random, physiologically based identification action from the authorized user database in response to the first access request, wherein the first random, physiologically based identification action comprises a requesting user speaking a random word or phrase that includes both at least one phoneme selected from the plurality of phonemes and at least one new phoneme not included within the plurality of phonemes, and wherein the first random, physiologically based identification action further comprises the requesting user performing one gesture selected from a group consisting of the requesting user touching his or her nose, the requesting user touching his or her ear, the requesting user smiling, the requesting user making a sad face, and the requesting user turning his or her head;

an output device coupled to the selection circuits to present the first random, physiologically based identification action to the requesting user and to request a response thereto; and evaluation circuits to compare the response to the initial biometric data, wherein, after the evaluation circuits authenticate the requesting user, the selection circuits request a second random, physiologically based identification action from the requesting user, wherein the evaluation circuits receive and store the second random, physiologically based identification action in the authorized user database, wherein the second random, physiologically based identification action behavior is not used for authenticating the requesting user responsive to the first access request, and wherein the second random, physiologically based identification action behavior is used for authenticating the requesting user responsive to a subsequent access request.

* * * * *